(12) United States Patent
Ishikawa et al.

(10) Patent No.: US 12,027,933 B2
(45) Date of Patent: Jul. 2, 2024

(54) MOTOR

(71) Applicant: NIDEC CORPORATION, Kyoto (JP)

(72) Inventors: Yuki Ishikawa, Kyoto (JP); Hironobu Kumagai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 300 days.

(21) Appl. No.: 17/686,410

(22) Filed: Mar. 4, 2022

(65) Prior Publication Data

US 2022/0286008 A1  Sep. 8, 2022

(30) Foreign Application Priority Data

Mar. 8, 2021  (JP) .................................. 2021-036655

(51) Int. Cl.
*H02K 3/50* (2006.01)
*H02K 11/25* (2016.01)

(52) U.S. Cl.
CPC .............. *H02K 3/50* (2013.01); *H02K 11/25* (2016.01); *H02K 2203/09* (2013.01)

(58) Field of Classification Search
CPC ....... H02K 3/50; H02K 11/25; H02K 2203/09
USPC ......................................................... 310/71
See application file for complete search history.

(56) References Cited

U.S. PATENT DOCUMENTS

| | | | | |
|---|---|---|---|---|
| 8,482,172 B2* | 7/2013 | Sasaki | .................... | H02K 3/522 310/43 |
| 8,826,713 B2* | 9/2014 | Akimoto | .................. | H02K 3/28 72/142 |
| 10,491,070 B2 | 11/2019 | Tamura | | |
| 2012/0062051 A1* | 3/2012 | Ueno | ..................... | H02K 1/148 310/43 |
| 2012/0326551 A1* | 12/2012 | Kinpara | ................... | H02K 3/12 310/180 |
| 2014/0091655 A1* | 4/2014 | Kajita | .................... | H02K 5/225 310/71 |

* cited by examiner

*Primary Examiner* — Terrance L Kenerly
(74) *Attorney, Agent, or Firm* — HAUPTMAN HAM, LLP

(57) ABSTRACT

A motor includes a rotor, a stator, and a bus bar unit disposed on one side in an axial direction of the stator. The stator includes conductor connection bodies and a segment coil. Each connection body includes first and second ends in the axial direction. The bus bar unit includes a neutral point bus bar connected to the first end and phase bus bars connected to the second end. The neutral point bus bar extends along a circumferential direction. The phase bus bar includes a main body extending along the circumferential direction and at least partially overlapping the neutral point bus bar and a connection portion extending from the main body to one side in the axial direction. The first end passes through one side in the axial direction of the neutral point bus bar and is connected to the connection portion.

19 Claims, 9 Drawing Sheets

MOTOR

CROSS-REFERENCE TO RELATED APPLICATIONS

The present invention claims priority under 35 U.S.C. § 119 to Japanese Patent Application No. 2021-036655 filed on Mar. 8, 2021, the entire content of which is incorporated herein by reference.

FIELD OF THE INVENTION

The present invention relates to a motor.

BACKGROUND

In a motor for an electric vehicle, distributed winding is adopted for the purpose of reducing vibration and noise. A winding structure using a plurality of segment coils is studied for the purpose of improving the efficiency of the motor. A bus bar that supplies current to the stator is connected to such a motor.

In recent years, there has been a demand for higher voltage of the motor, and sometimes a wide bus bar is adopted in accordance with an increase in a current amount. In the conventional structure, when a wide bus bar is adopted, the bus bar protrudes radially outward with respect to the motor in response to the bus bar, and the motor may be increased in size.

SUMMARY

In one aspect of the present invention, an exemplary motor includes a rotor rotatable about a center axis line, a stator disposed on a radial outside of the rotor, and a bus bar unit disposed on one side in an axial direction of the stator. The stator includes a stator core and a winding portion including a plurality of conductor connection bodies and configuring a segment coil. The conductor connection body includes a first end and a second end that are provided at one end and the other end of the conductor connection body, and extend to one side in the axial direction. The bus bar unit includes a neutral point bus bar connected to the first end and a plurality of phase bus bars connected to the second end. The neutral point bus bar extends along a circumferential direction. The phase bus bar includes a main body extending along the circumferential direction, at least a part of the main body overlapping the radial outside of the neutral point bus bar and a connection portion extending from the main body to one side in the axial direction. The first end passes through one side in the axial direction of the neutral point bus bar and is connected to the connection portion.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is a vertical direction in which a positive side is an "upper side" and a negative side is a "lower side". A center axis line J appropriately illustrated in each drawing is a virtual line that is parallel to the Z-axis direction and extends in the vertical direction. In the following description, an axial direction of the center axis line J, namely, the direction parallel to the vertical direction is simply referred to as an "axial direction", the upper side is referred to as a "one side in the axial direction", and the lower side is referred to as "the other side in the axial direction". Sometimes a radial direction about the center axis line J is simply referred to as a "radial direction". Furthermore, sometimes the circumferential direction centered on the center axis line J is simply referred to as the "circumferential direction", a clockwise direction when viewed from above is referred to as "one side in the circumferential direction", and a counterclockwise direction when viewed from above is referred to as "the other side in the circumferential direction".

The vertical direction, the upper side, and the lower side are merely names for describing an arrangement relationship between respective units, and an actual arrangement relationship and the like may be other than the arrangement relationship indicated by these names. Furthermore, the directions described as one side in the axial direction and the other side in the axial direction can reproduce an effect of the embodiment even when they are replaced with each other. Similarly, the directions described as one side in the circumferential direction θ1 and the other side in the circumferential direction θ2 can reproduce the effect of the embodiment even when they are replaced with each other.

Figure 1:
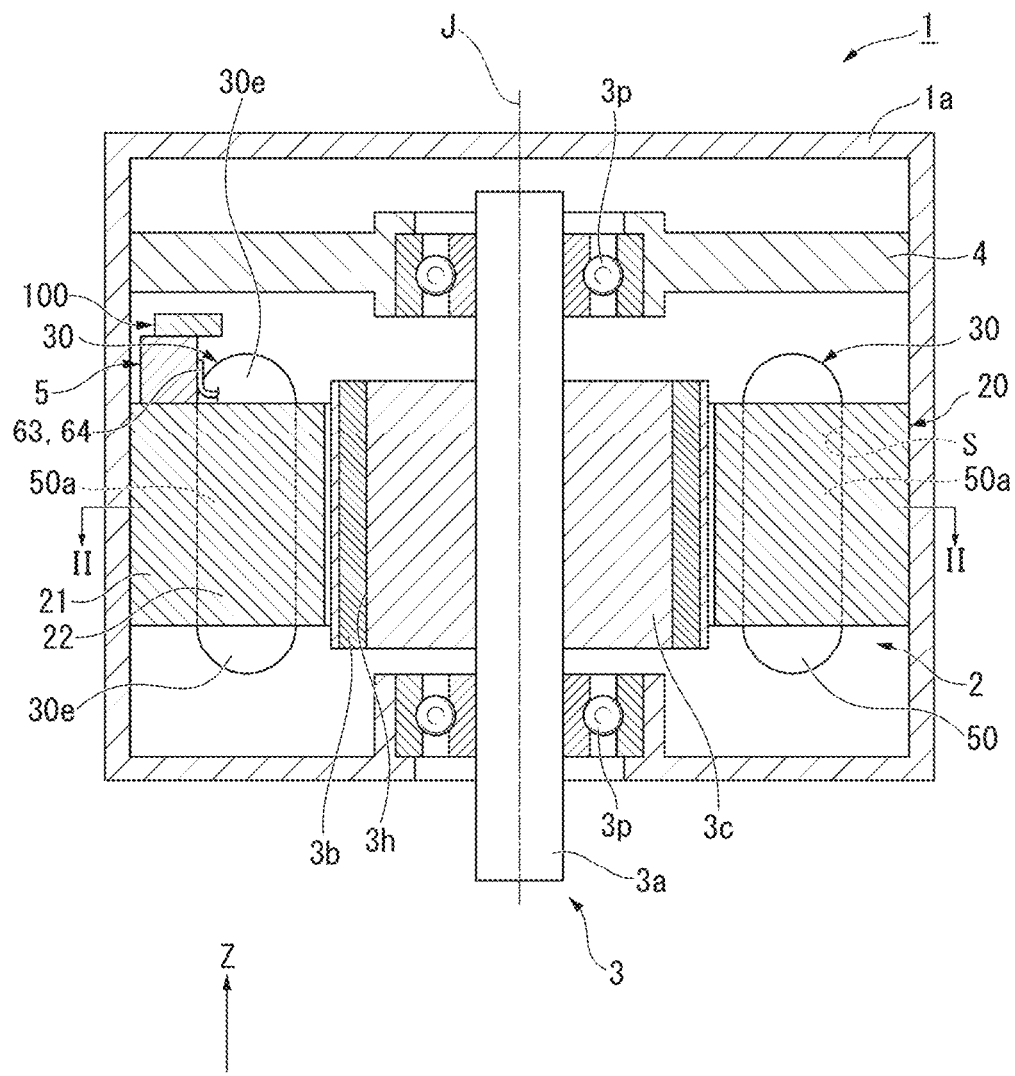
FIG. 1 is a schematic sectional view illustrating a motor according to an embodiment.

FIG. 1 is a schematic sectional view illustrating a motor 1 according to an embodiment.

The motor 1 of the embodiment is an inner-rotor motor. Furthermore, the motor 1 of the embodiment is a three-phase AC motor. The center of the motor 1 is the center axis line J.

The motor 1 includes a rotor 3, a stator 2, a bus bar unit 5, a connection bus bar unit 100, a bearing holder 4, and a housing 1a that accommodates them.

The rotor 3 is rotatable about the center axis line J. The rotor 3 is arranged on the radially inside of the annular stator 2. That is, the rotor 3 is opposed to the stator 2 in the radial direction. The rotor 3 includes a shaft 3a, a rotor magnet 3b, and a rotor core 3c.

The shaft 3a extends in an axial direction along a center axis line J. The shaft 3a has a columnar shape centered on the center axis line J and extending in the axial direction. The shaft 3a is supported by two bearings 3p so as to be rotatable about the center axis line J.

Figure 2:
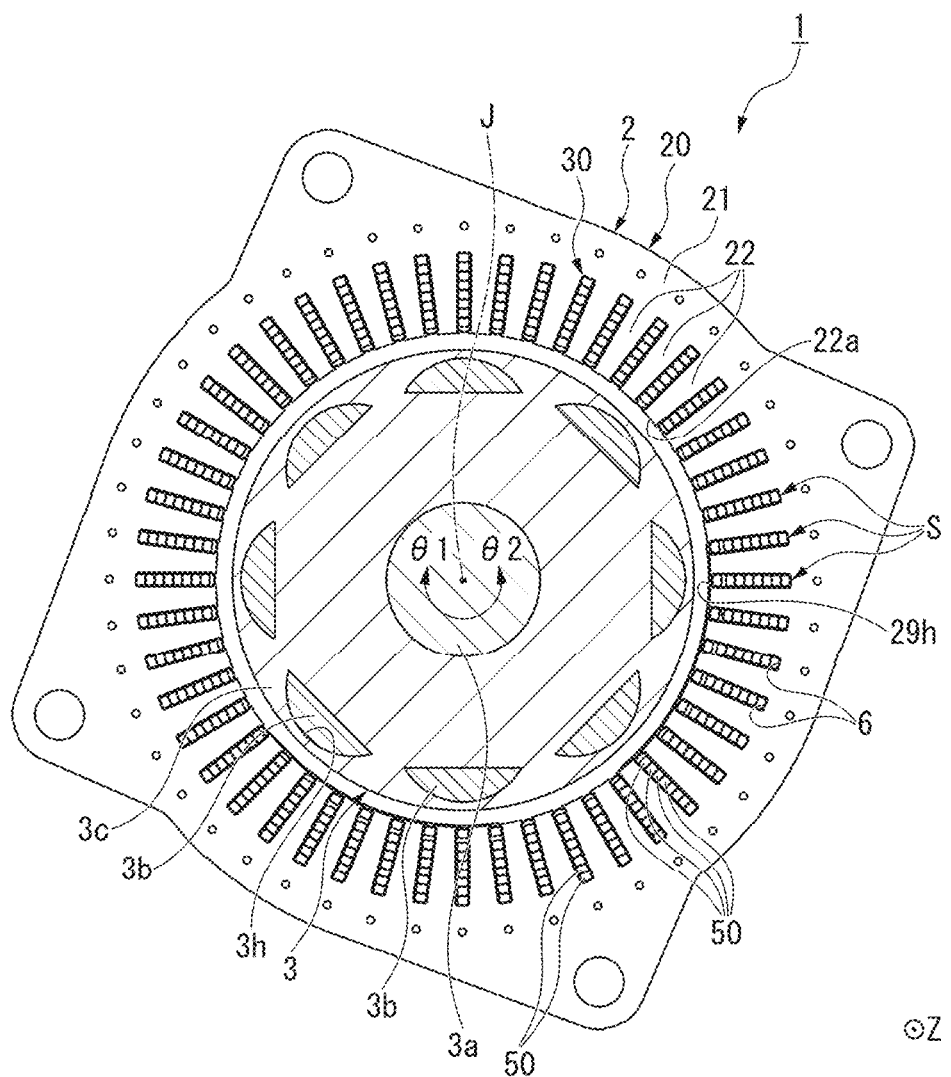
FIG. 2 is a sectional view illustrating the motor taken along a line II-II of FIG. 1.

FIG. 2 is a sectional view illustrating the motor 1 taken along a line II-II of FIG. 1.

The rotor core 3c is configured by stacking magnetic steel sheets. The rotor core 3c has a cylindrical shape extending in the axial direction. An inner peripheral surface of the rotor core 3c is fixed to an outer peripheral surface of the shaft 3a. A holding hole 3h into which the rotor magnet 3b is inserted and fixed is made in the rotor core 3c.

The rotor magnet 3b is opposed to the stator 2 in the radial direction. The rotor magnet 3b is held while embedded in the rotor core 3c. The rotor magnet 3b of the embodiment has eight poles. A number of poles of the rotor 3 is not limited to the embodiment. Furthermore, the rotor magnet 3b may be a magnet of another form such as an annular ring magnet.

The stator 2 is arranged to the rotor 3 in the radial direction with a gap interposed therebetween. In the embodiment, the stator 2 is arranged on the radially outside of the rotor 3. The stator 2 includes a stator core 20, a winding portion 30, and a plurality of insulating papers 6.

The stator core 20 has the annular shape centered on the center axis line J. The stator core 20 consists of electromagnetic steel sheets stacked along the axial direction. The stator core 20 includes a core back 21 having an annular shape centered on the center axis line J and a plurality of teeth 22 extending radially inward from the core back 21.

The plurality of teeth 22 are arranged at regular intervals in the circumferential direction. An umbrella 22a is provided at a tip portion on the inside in the radial direction of the teeth 22. The umbrella 22a projects on both sides in the circumferential direction with respect to the teeth 22. That is, a dimension in the circumferential direction of the umbrella 22a is larger than a dimension in the circumferential direction of the teeth 22. The surface of the umbrella 22a facing inward in the radial direction is opposite to the outer peripheral surface of the rotor 3 in the radial direction with a gap interposed therebetween.

The winding portion 30 is mounted on the teeth 22. A slot S is provided between the teeth 22 adjacent to each other in the circumferential direction. That is, a plurality of slots S arranged in the circumferential direction are provided in the stator core 20.

A conductor 50 of the winding portion 30 is accommodated in the slot S. The insulating paper 6 is arranged one by one in the slot S. The insulating paper 6 secures insulation between the winding portion 30 and the stator core 20 in the slot S.

Eight layers arranged in the radial direction are provided in one slot S. In one slot, one conductor 50 is placed on each layer. In the slot S, eight conductors 50 are arranged in a row along the radial direction.

The slot S includes an opening 29h that is open radially inward. The opening 29h is located between the umbrellas 22a located at the tips of the adjacent teeth 22. A width dimension along the circumferential direction of the opening 29h is smaller than the dimension along the circumferential direction of the conductor 50. For this reason, the conductor 50 is difficult to pass through the opening 29h, and the conductor 50 is prevented from being separated from the stator core 20.

In the embodiment, the stator core 20 has 48 teeth 22. That is, the stator 2 of the embodiment has 48 slots. The number of slots of the stator 2 is appropriately set according to the number of poles of the rotor magnet 3b and a method for winding the winding portion 30.

Figure 3:
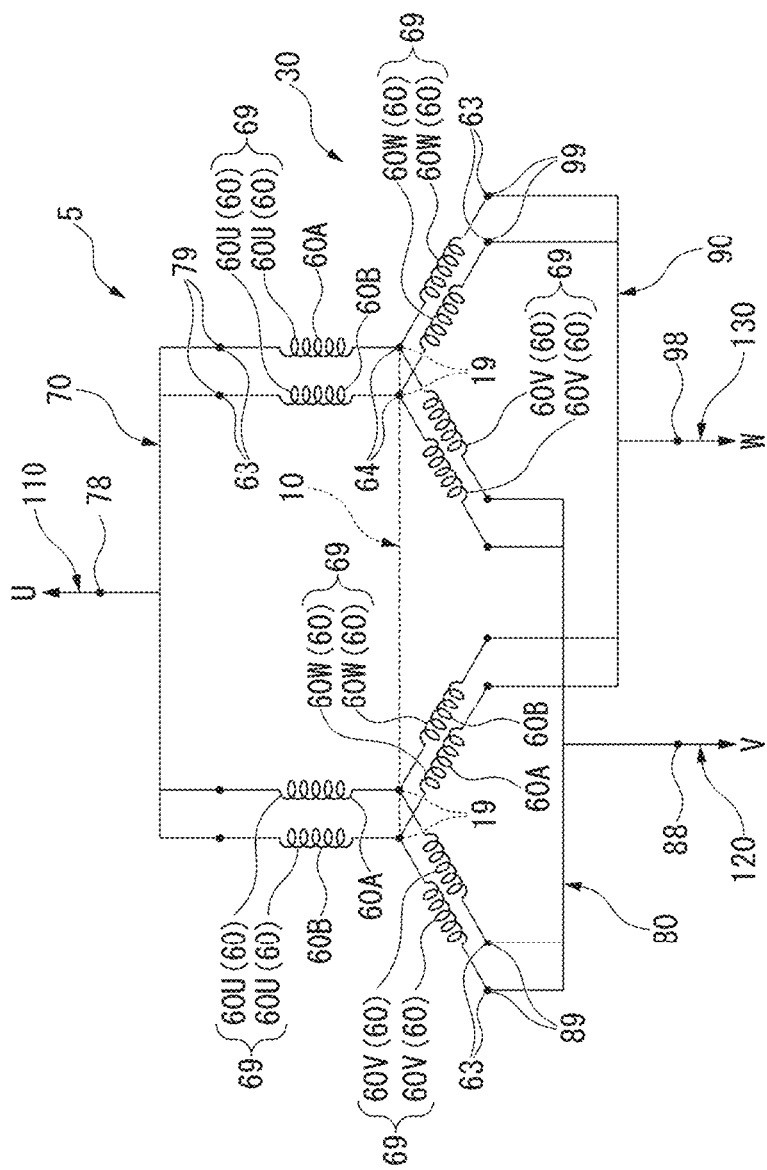
FIG. 3 is a schematic diagram illustrating a circuit configured by a winding portion and a bus bar unit of the embodiment.

FIG. 3 is a schematic diagram illustrating a circuit configured by the winding portion 30 and the bus bar unit 5 of the embodiment.

The winding portion 30 of the embodiment includes a plurality of (12 in the embodiment) conductor connection bodies 60 to configure a segment coil. The 12 conductor connection bodies 60 are classified into four U-phase conductor connection bodies 60U, four V-phase conductor connection bodies 60V, and four W-phase conductor connection bodies 60W.

Furthermore, although described in detail later, the bus bar unit 5 includes three phase bus bars 70, 80, 90 and one neutral point bus bar 10. The three phase bus bars 70, 80, 90 are classified into a first phase bus bar 70, a second phase bus bar 80, and a third phase bus bar 90.

The U-phase conductor connection body 60U, the V-phase conductor connection body 60V, and the W-phase conductor connection body 60W are Y-connected by the neutral point bus bar 10 and the phase bus bars 70, 80, 90. In the embodiment, four Y-connections corresponding to the four conductor connection bodies 60 of each phase are configured, and the Y-connections are connected in parallel. That is, the winding portion 30 is 4Y-connected by the bus bar unit 5.

In the embodiment, the case where the winding portion 30 includes four conductor connection bodies 60 having the same phase has been described. However, when the winding portion 30 includes at least two conductor connection bodies 60, and when these conductor connection bodies 60 configure a connection body pair 69 passing through the adjacent slots S in the circumferential direction, the winding configuration similar to that of the embodiment can be obtained. Accordingly, the plurality of conductor connection bodies 60 need only have Y-connections of 2×M with M as a natural number (M=2 in the embodiment).

The conductor connection body 60 includes a first end 63 and a second end 64. The first end 63 and the second end 64 are provided at one end and the other end of the conductor connection body 60, respectively. The conductor connection body 60 is mounted on the stator core 20 between the first end 63 and the second end 64 to configure a coil of each phase. The conductor connection body 60 is connected to the bus bar unit 5 in the first end 63 and the second end 64.

The second ends 64 of the four U-phase conductor connection bodies 60U, the four V-phase conductor connection bodies 60V, and the four W-phase conductor connection bodies 60W are connected to one neutral point bus bar 10. Thus, the second end 64 of the 12 conductor connection bodies 60 becomes the same potential and configures a neutral point. That is, the neutral point bus bar 10 configures the neutral point of the three-phase circuit.

The first ends 63 of the four U-phase conductor connection bodies 60U are connected to the first phase bus bar 70. The first ends 63 of the four V-phase conductor connection bodies 60V are connected to the second phase bus bar 80. The first ends 63 of the four W-phase conductor connection bodies 60W are connected to the third phase bus bar 90. Alternating currents in which the phase is deviated for each 120° are passed through the phase bus bars 70, 80, 90.

Two of the four conductor connection bodies 60 having the same phase pass through the adjacent slots S and are mounted on the stator core 20. In the present specification, two conductor connection bodies 60 passing through the adjacent slots S are referred to as the connection body pair 69. Furthermore, in the following description, when two conductor connection bodies 60 forming the connection body pair 69 are distinguished from each other, one is referred to as a first conductor connection body 60A and the other is referred to as a second conductor connection body 60B.

Figure 4:
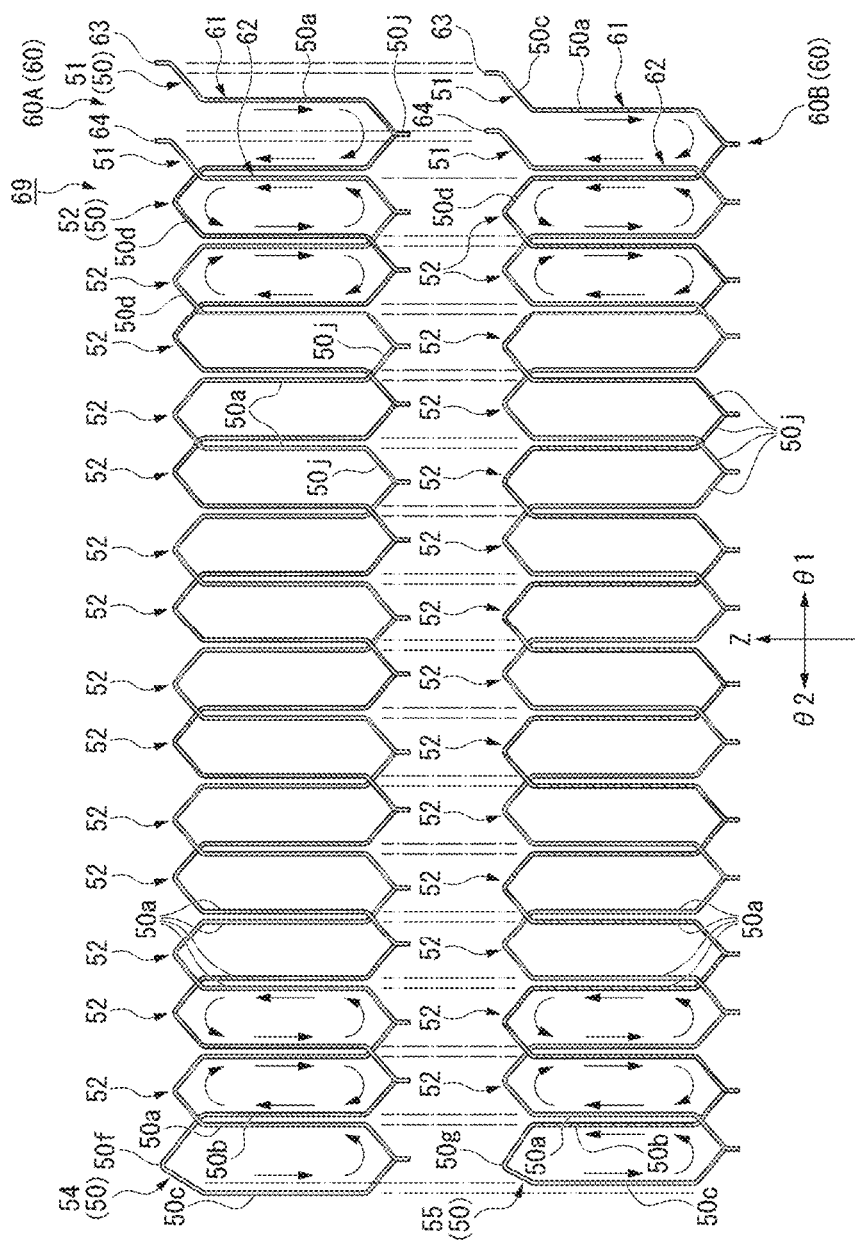
FIG. 4 is a schematic diagram illustrating a winding configuration of a conductor connection body of the embodiment.

FIG. 4 is a schematic diagram illustrating a winding configuration of two conductor connection bodies 60 forming the connection body pair 69.

As illustrated in FIG. 4, the conductor connection body 60 is configured by connecting the plurality of conductors 50 in series. Each conductor 50 is configured by bending a flat wire. Accordingly, a space factor of the conductor 50 in the slot S can be improved as compared with the case of using a round wire. In the present specification, the "flat wire" is a wire rod having a quadrangular sectional shape or a substantially quadrangular sectional shape. In the present specification, the term "substantially square shape" includes a square shape with rounded corners. Although not illustrated, the conductor 50 in the embodiment has an enamel coating on the surface.

The plurality of conductors 50 configuring the conductor connection body 60 are classified into an end conductor 51, a hairpin conductor 52, a first folded conductor 54, and a second folded conductor 55.

Each of the various conductors 50 includes at least straight portions 50a, 50b, 50c extending linearly along the axial direction (Z-direction) and a connection portion 50j located at an end portion of the lower side (the other side in the axial direction). The straight portions 50a, 50b, 50c pass through the slot S. That is, the conductor connection body 60 is accommodated in the slot S at the straight portions 50a, 50b, 50c. The conductor connection body 60 extends above and below the stator core 20 in regions other than the straight portions 50a, 50b, 50c. The portions extending from the upper side and the lower side of the stator core 20 configure a coil end 30e (see FIG. 1) of the stator core 20.

The straight portion 50a is classified into a first straight portion 50a, a second straight portion 50b, and a third straight portion 50c. The first straight portion 50a is a straight portion connected to a crossing portion 50d or the ends 63, 64. The second straight portion 50b and the third straight portion 50c are straight portions connected to one end or the other end of the folded portions 50f, 50g.

A connection portion 50j is connected to a connection portion 50j of another conductor 50. The connection portions 50j of the pair of conductors 50 are joined to each other by joining means such as welding. The connection portion 50j is bent in the circumferential direction after the conductor 50 is mounted on the stator core 20, and the connection portion 50j is welded to the connection portion 50j of another conductor 50. In the conductor 50 before mounting on the stator core 20, the connection portion 50j has a straight line continuous to the straight portions 50a, 50b, 50c. The conductor 50 is attached to the stator core 20 by inserting the connection portion 50j and the straight portions 50a, 50b, 50c into the slot S from the upper side (one side in the axial direction) of the stator core 20. The connection portion 50j is bent in the circumferential direction and welded to another connection portion 50j, so that the conductor 50 is prevented from being axially detached from the stator core 20.

The plurality of conductors 50 are inserted into the slot S of the stator core 20 from the upper side and joined on the lower side, so that the stator 2 of the embodiment can be assembled. Consequently, a complicated assembly process is not required, but an assembly process can be simplified.

Various conductors 50 will be described below.

The end conductor 51 includes each one of the ends 63, 64, one straight portion 50a, and one connection portion 50j. The ends 63, 64 are located at the upper end portion of the end conductor 51. The ends 63, 64 are bent in the circumferential direction with respect to the straight portion 50a. In the end conductor 51, the ends 63, 64 and the connection portion 50j extend in the direction opposite to the circumferential direction with respect to the straight portion 50a. In the end conductor 51, the ends 63, 64 extend from the upper end of the straight portion 50a to one side in the circumferential direction θ1, and the connection portion 50j extends from the lower end of the straight portion 50a to the other side in the circumferential direction θ2.

One of the neutral point bus bar 10, the first phase bus bar 70, the second phase bus bar 80, and the third phase bus bar 90 is connected to the ends 63, 64. The two ends 63, 64 are provided at both end portions of the conductor connection body 60, respectively. In the two ends 63, 64, one is the first end 63 and the other is the second end 64.

The hairpin conductor 52 includes two straight portions 50a, two connection portions 50j, and one crossing portion 50d. The crossing portion 50d is arranged at the upper end portion of the hairpin conductor 52. The crossing portion 50d passes two straight portions 50a to each other. That is, in the hairpin conductor 52, two straight portions 50a are connected to each other through the crossing portion 50d. In the hairpin conductor 52, two connection portions 50j are connected to the lower ends of different straight portions 50a. The plurality of crossing portions 50d project from the upper end surface (one side in the axial direction) of the stator core 20.

In the hairpin conductor 52, two straight portions 50a are lined up with the number of slots per pole s. At this point, the number of slots per pole s means the number of slots S of the stator 2 arranged between magnetic poles of the rotor 3 in the combination of the rotor 3 and the stator 2. The number of slots per pole s is calculated by (the total number of slots in the stator 2)/(the number of magnetic poles in the rotor 3). In the embodiment, the number of magnetic poles of the rotor 3 is 8, and the number of slots of the stator 2 is 48, so that the number of slots per pole s is 6. In the hairpin conductor 52, the two straight portions 50a are separated from each other by six slots in the circumferential direction.

In the hairpin conductor 52, two connection portions 50j are bent in opposite directions in the circumferential direction. In two connection portions 50j, one located on one side θ1 in the circumferential direction extends from the lower end of the straight portion 50a to the other side θ2 in the circumferential direction, and the other located on the other side θ2 in the circumferential direction extends from the lower end of the straight portion 50a to one side θ1 in the circumferential direction. Each 12 hairpin conductors 52 are provided in the first conductor connection body 60A and the second conductor connection body 60B.

The first folded conductor 54 includes two straight portions 50b, 50c, two connection portions 50j, and one first folded portion (folded portion) 50f. The second folded conductor 55 includes two straight portions 50b, 50c, two connection portions 50j, and one second folded portion (folded portion) 50g. The first folded portion 50f and the second folded portion 50g are arranged at the upper end portion of the first folded conductor 54 or the second folded conductor 55.

The first folded portion 50f and the second folded portion 50g pass two straight portions 50b, 50c to each other. That is, in the first folded conductor 54 and the second folded conductor 55, the two straight portions 50b, 50c are connected to each other through the first folded portion 50f or the second folded portion 50g.

In the first folded conductor 54 and the second folded conductor 55, two connection portions 50j are bent in one side θ1 in the circumferential direction. That is, in the first folded conductor 54 and the second folded conductor 55, two connection portions 50*j* extend from the lower ends of the straight portions 50*b*, 50*c* to one side θ1 in the circumferential direction.

The first folded conductor 54 and the second folded conductor 55 have two straight portions 50*b*, 50*c*, respectively. In two straight portions 50*b*, 50*c*, one located on one side θ1 in the circumferential direction is the second straight portion 50*b*, and one located on the other side θ2 in the circumferential direction is the third straight portion 50*c*.

In the first folded conductor 54 and the second folded conductor 55, the distances between two straight portions 50*b*, 50*c* are different from each other. In the first folded conductor 54, the second straight portion 50*b* and the third straight portion 50*c* are arranged in the circumferential direction with the number of slots per pole s+1 (7 slots in the embodiment). On the other hand, in the second folded conductor 55, the second straight portion 50*b* and the third straight portion 50*c* are arranged in the circumferential direction with the number of slots per pole s−1 (5 slots in this embodiment). For this reason, the first folded portion 50*f* has a larger crossing amount in the circumferential direction by two slots than the second folded portion 50*g*. One first folded conductor 54 is provided in the first conductor connection body 60A. On the other hand, one second folded conductor 55 is provided in the second conductor connection body 60B.

Winding configurations of the first conductor connection body 60A and the second conductor connection body 60B will be described below.

In the first conductor connection body 60A, two end conductors 51 are arranged at both ends of the first conductor connection body 60A, and the first folded conductor 54 is arranged substantially in the middle. The first conductor connection body 60A is wave-wound every six slots toward the other side θ2 in the circumferential direction from the first end 63 to the first folded portion 50*f*. Furthermore, the first conductor connection body 60A is wave-wound every six slots toward one side θ1 in the circumferential direction from the first folded portion 50*f* to the second end 64.

At this point, in the first conductor connection body 60A, the region that is wave-wound on the other side θ2 in the circumferential direction between the first end 63 and the first folded portion 50*f* is referred to as a first portion 61. In the first conductor connection body 60A, the region that is wave-wound on one side θ1 in the circumferential direction between the first folded portion 50*f* and the second end 64 is referred to as a second portion 62. That is, the first conductor connection body 60A includes the first end 63, the first portion 61 wave-wound from the first end 63 to the other side θ2 in the circumferential direction, the first folded portion 50*f* connected to the end portion on the other end θ2 in the circumferential direction of the first portion 61, the second portion 62 wave-wound from the first folded portion 50*f* to one side θ1 in the circumferential direction, and the second end 64 connected to the end portion of one side θ1 in the circumferential direction of the second portion 62.

In the second conductor connection body 60B, two end conductors 51 are arranged at the ends of both ends of the second conductor connection body 60B. The second conductor connection body 60B in which the second folded conductor 55 is arranged substantially in the middle is wave-wound every six slots toward the other side θ2 in the circumferential direction from the first end 63 to the second folded portion 50*g* (first portion 61). Furthermore, the second conductor connection body 60B is wave-wound every six slots toward one side θ1 in the circumferential direction between (second portion 62) the second folded portion 50*g* and the second end 64. That is, the second conductor connection body 60B includes the first end 63, the first portion 61 wave-wound from the first end 63 to the other side θ2 in the circumferential direction, the second folded portion 50*g* connected to the end portion of the other side θ2 in the circumferential direction of the first portion 61, the second portion 62 wave-wound from the second folded portion 50*g* to one side θ1 in the circumferential direction, and the second end 64 connected to the end portion of one side θ1 in the circumferential direction of the second portion 62.

The conductor connection body 60 of the embodiment is wave-wound with the number of slots per pole s in the first portion 61 and the second portion 62. That is, the conductor connection body 60 is mounted on the stator core 20 by full pitch winding. For this reason, according to the embodiment, the plurality of conductors 50 arranged in the same slot S are all a part of the conductor connection body 60 having the same phase. Consequently, according to the embodiment, the conductor connection bodies 60 having different phases is not required to be insulated in one slot S, but the insulation is easy to secure.

In the embodiment, the winding portion 30 has the first end 63, the second end 64, the crossing portion 50*d*, and the folded portion 50*f*, 50*g*. The first end 63, the second end 64, the crossing portion 50*d*, and the folded portions 50*f*, 50*g* configure the coil end 30*e* on the upper side of the stator core 20. On the other hand, the connection portion 50*j* configures the coil end 30*e* on the lower side of the stator core 20. The first end 63 and the second end 64 are arranged on the outermost circumference of the coil end 30*e*. That is, the first end 63 and the second end 64 are located on the radial outside of the plurality of crossing portions 50*d*. The first end 63 extends upward (one side in the axial direction) from the stator core 20 and is connected to the phase bus bars 70, 80, 90. Similarly, the second end 64 extends upward (one side in the axial direction) from the stator core 20 and is connected to the neutral point bus bar 10. According to the embodiment, the first end 63 and the second end 64 are arranged on the outermost periphery of the coil end 30*e*, so that the bus bar unit 5 can be arranged on the radial outside of the coil end 30*e*. Thus, the dimensions in the vertical direction of the motor 1 can be reduced as compared with the case where the motor 1 is arranged above the coil end 30*e*.

According to the embodiment, the folded portions 50*f*, 50*g* are arranged on the innermost circumference of the coil end 30*e*. That is, the folded portions 50*f*, 50*g* are arranged on the radially inside of the plurality of crossing portions 50*d*. For this reason, the area radially inside the coil end 30*e* can be used as the arrangement area of the folded portions 50*f*, 50*g*, and the dimension in the vertical direction of the coil end 30*e* can be reduced.

Furthermore, according to the embodiment, the folded portions 50*f*, 50*g* are located on the innermost circumference of the coil end 30*e*, so that two ends 63, 64 can be located in the outermost circumference of the coil end 30*e*. That is, according to the embodiment, the first end 63 and the second end 64 extend from the outermost layer. Accordingly, a connection step between the neutral point bus bar 10 and the first end 63 and a connection step between the phase bus bars 70, 80, 90 and the second end 64 can be performed from the radial direction with respect to the coil end 30*e*, and a manufacturing process of the motor 1 can be simplified.

As illustrated in FIG. 4, the first conductor connection body 60A and the second conductor connection body 60B have opposite orders in the circumferential direction of the passing slots S at the folded portions 50f, 50g. The first end 63 of the first conductor connection body 60A is located on one side in the circumferential direction of the first end 63 of the second conductor connection body 60B. Furthermore, the second end 64 of the first conductor connection body 60A is located on the other side in the circumferential direction of the second end 64 of the second conductor connection body 60B. The U-phase connection body pair 69, the V-phase connection body pair 69, and the W-phase connection body pair 69 are arranged side by side in this order toward the other side θ2 in the circumferential direction.

As illustrated in FIG. 1, the bus bar unit 5 is disposed above the stator 2. More specifically the bus bar unit 5 is disposed on the upper side of the core back 21 and on the radial outside of the coil end 30e. Accordingly, the bus bar unit 5 is radially opposite to the coil end 30e. The bus bar unit 5 is connected to the ends 63, 64 of the conductor connection body 60 extending from the coil end 30e.

Figure 5:
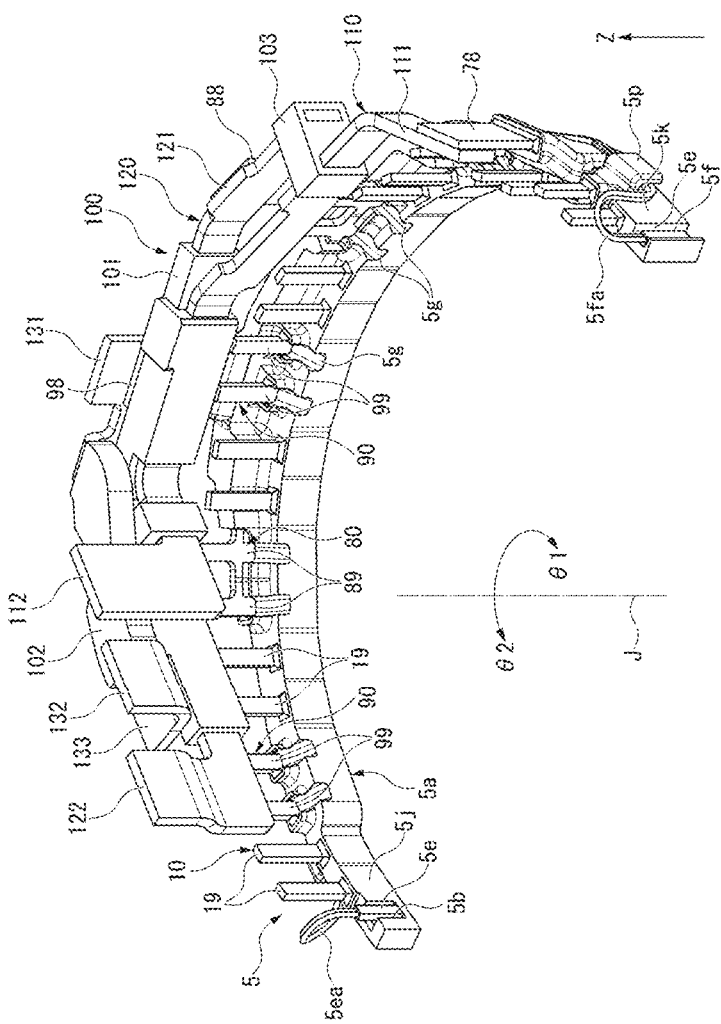
FIG. 5 is a perspective view illustrating the bus bar unit and a connection bus bar unit of the embodiment.
Figure 6:
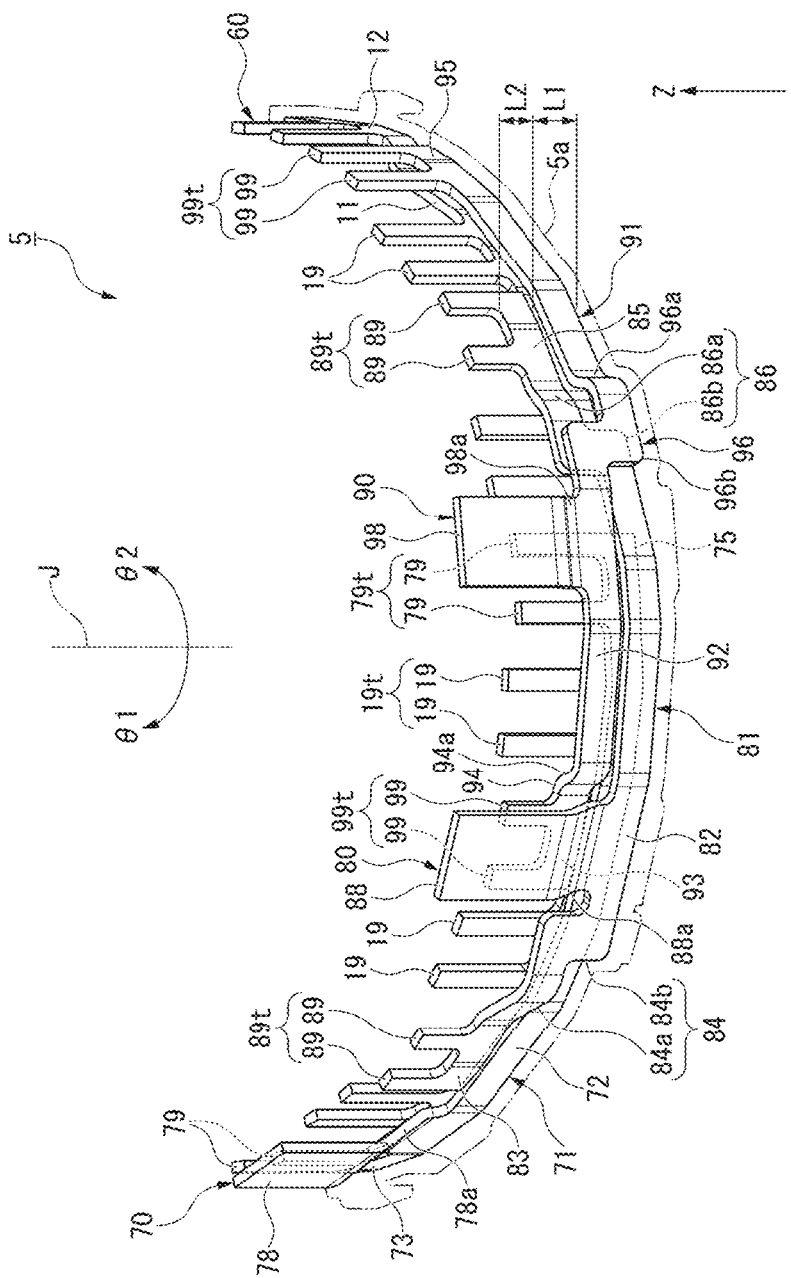
FIG. 6 is a perspective view illustrating the bus bar unit of the embodiment.
Figure 7:
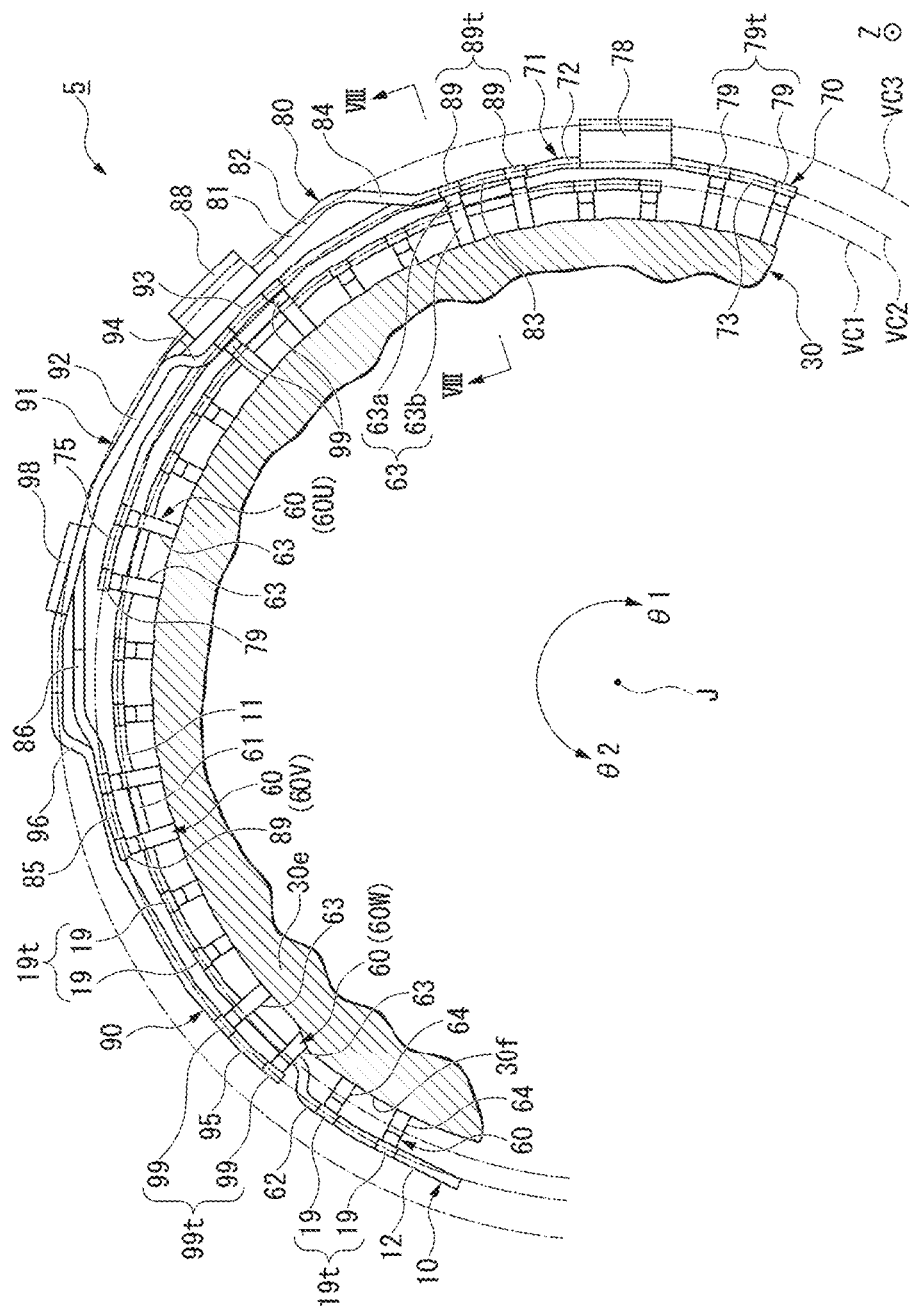
FIG. 7 is a plan view illustrating the bus bar unit of the embodiment.

FIG. 5 is a perspective view illustrating the bus bar unit 5 and the connection bus bar unit 100. FIG. 6 is a perspective view of the bus bar unit 5. FIG. 7 is a plan view of the bus bar unit 5. In FIGS. 6 and 7, the illustration of a holding member 5a of the bus bar unit 5 is omitted.

In FIG. 6, layers in the vertical direction (axial direction) in which the respective portions of the bus bars 10, 70, 80, 90 of the bus bar unit 5 are disposed are illustrated as a first layer L1 and a second layer L2. The second layer L2 is located above (on one side in the axial direction of) the first layer L1.

FIG. 7 illustrates a first virtual circle VC1, a second virtual circle VC2, and a third virtual circle VC3 that are centered on the center axis line J. The first virtual circle VC1, the second virtual circle VC2, and the third virtual circle VC3 have larger radii in this order.

As illustrated in FIG. 5, the bus bar unit 5 includes the neutral point bus bar 10, the plurality of phase bus bars 70, 80, 90, the holding member 5a, and two thermometers be, 5f. One of the two thermometers 5e, 5f is the bus bar thermometer 5e, and the other is the oil thermometer 5f.

Figure 8:
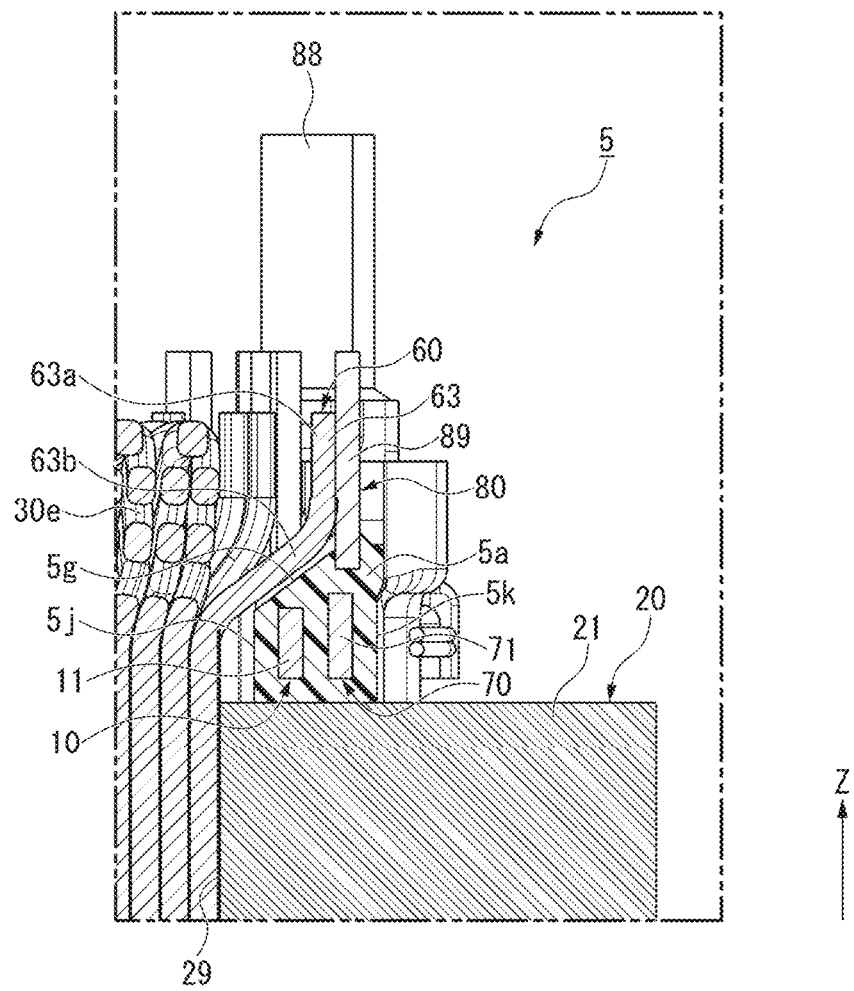
FIG. 8 is a sectional view illustrating the bus bar unit taken along a line VIII-VIII in FIG. 7.

As illustrated in FIGS. 7 and 8, the neutral point bus bar 10 and the phase bus bars 70, 80, 90 have a plate shape with the radial direction as the plate thickness direction. The neutral point bus bar 10 and the phase bus bars 70, 80, 90 are formed by press working. The neutral point bus bar 10 and the phase bus bars 70, 80, 90 extend along the circumferential direction.

As illustrated in FIG. 7, the neutral point bus bar 10 is disposed on the radial inside of the phase bus bars 70, 80, 90. The neutral point bus bar 10 includes a neutral point bus bar main body 11 and a plurality of neutral point connection portions 19.

The neutral point bus bar main body 11 extends in an arcuate shape centered on the center axis line J when viewed from the axial direction. The neutral point bus bar main body 11 is disposed in the first layer L1 over an entire length.

The neutral point bus bar main body 11 has a retreat portion 12 that is curved radially outward and extends while detouring at an end portion on the other side θ2 in the circumferential direction. That is, the retreat portion 12 offset radially outward is provided at the end portion on the other side θ2 in the circumferential direction of the neutral point bus bar 10. When viewed from the axial direction, the retreat portion 12 is disposed on the second virtual circle VC2, and a region of the neutral point bus bar 10 other than the retreat portion 12 is disposed on the first virtual circle VC1.

As illustrated in FIG. 7, the neutral point bus bars 10 are disposed in an arcuate shape having the same radius centered on the center axis line J in the region other than the retreat portion 12 when viewed from the axial direction. On the other hand, the neutral point bus bar 10 is disposed closer to the radial outside than other regions in the retreat portion 12. As described above, the neutral point bus bar 10 is disposed on the radially inside of the phase bus bars 70, 80, 90 and extends in the arcuate shape. For this reason, the inner circumferential surface of the bus bar unit 5 facing the radial inside is recessed radially outward in the region overlapping the retreat portion 12.

The bus bar unit 5 surrounds the coil end 30e of the stator 2 from radially outside. In the coil end 30e, a protrusion 30f protruding radially outward on the circumferential outside of the region where the ends 63, 64 are arranged in the circumferential direction. In the embodiment, a circumferential position of the retreat portion 12 is matched with a circumferential position of the protrusion 30f. According to the embodiment, the bus bar unit 5 is recessed radially outward in the retreat portion 12, so that an insulation distance can be secured while interference between the bus bar unit 5 and the coil end 30e is prevented.

The retreat portion 12 extends in the circumferential direction from any of the plurality of phase bus bars 70, 80, 90. Accordingly, the retreat portion 12 does not overlap the phase bus bars 70, 80, 90 in the radial direction. Even when the retreat portion 12 is curved radially outward, the retreat portion 12 does not come close to the phase bus bars 70, 80, 90, but can maintain the insulation with the phase bus bars 70, 80, 90.

The neutral point connection portion 19 protrudes upward from the neutral point bus bar main body 11. The plurality of neutral point connection portions 19 are arranged along the circumferential direction. The neutral point connection portion 19 connected to the retreat portion 12 is disposed on the second virtual circle VC2, and other neutral point connection portions 19 are disposed on the first virtual circle VC1.

The neutral point connection portion 19 extends in the vertical direction with a uniform width. The shapes of all the neutral point connection portions 19 are matched with each other. A second end 64 extending radially outward from the coil end 30e is connected to each neutral point connection portion 19 by joining means such as welding. That is, the neutral point bus bar 10 is connected to the second end 64 of the conductor connection body 60 at the neutral point connection portion 19.

The neutral point bus bar 10 of the embodiment includes 12 neutral point connection portions 19. The 12 neutral point connection portions 19 are classified into 6 neutral point connection pairs 19t each of which has a pair of two neutral point connection portions adjacent to each other in the circumferential direction. That is, the neutral point bus bar 10 has the six neutral point connection pairs 19t in each of which the two neutral point connection portions 19 are arranged in the circumferential direction. The 12 neutral point connection portions 19 are provided in the neutral point bus bar 10 of the embodiment. Accordingly, the neutral point bus bar 10 includes the six neutral point connection pairs 19t.

The plurality of neutral point connection pairs 19t are arranged at equal intervals along the circumferential direction. The two second ends 64 connected to the neutral point connection pairs 19t are the second end 64 of the two conductor connection bodies 60 (connection body pair 69 in FIG. 4) that pass through the slots S adjacent to each other in the circumferential direction and are mounted on the stator core 20. Accordingly, the two conductor connection bodies 60 connected to the neutral point connection pair 19*t* are in phase with each other.

As illustrated in FIG. 6, the phase bus bars 70, 80, 90 include main bodies 71, 81, 91, input terminal portions 78, 88, 98, and a plurality of connection portions 79, 89, 99, respectively. The shapes of the main bodies 71, 81, 91 of the respective phase bus bars 70, 80, 90 are different from each other, and the shapes of the input terminal portions 78, 88, 98 of the respective phase bus bars 70, 80, 90 are different from each other. On the other hand, the plurality of connection portions 79, 89, 99 of the respective phase bus bars 70, 80, 90 have the substantially same shape. At least a part of each of the main bodies 71, 81, 91 of the three phase bus bars 70, 80, 90 overlaps the radial outside of the neutral point bus bar 10.

As illustrated in FIG. 6, in the phase bus bars 70, 80, 90, the connection portions 79, 89, 99 protrude upward from the main bodies 71, 81, 91. All the connection portions 79, 89, 99 are disposed on the second virtual circle VC2.

The connection portions 79, 89, 99 extend in the vertical direction with a uniform width. The shapes of all the connection portions 79, 89, 99 are matched with each other. The connection portions 79, 89, 99 and the neutral point connection portion 19 have the same shape. The first end 63 extending radially outward from the coil end 30*e* is connected to each of the connection portions 79, 89, 99 by joining means such as welding.

In the embodiment, the axial positions of all the connection portions 79, 89, 99 of all the phase bus bars 70, 80, 90 and the neutral point connection portion 19 are matched with each other. The connection portions 79, 89, 99 and the neutral point connection portion 19 are connected to the first end 63 or the second end 64 by joining means such as resistance welding. According to the embodiment, the axial positions of all the connection portions 79, 89, 99 and the neutral point connection portion 19 are matched with each other, so that the connection portions 19, 89, 99 and the neutral point connection portion 19 can be joined without moving a joining device used for each joining means such as an electrode for resistance welding in the axial direction. As a result, the joining process can be simplified.

In the embodiment, each of the phase bus bars 70, 80, 90 includes four connection portions. That is, the first phase bus bar 70 includes four connection portions 79, the second phase bus bar 80 includes four connection portions 89, and the third phase bus bar 90 includes four connection portions 99. Each of the phase bus bars 70, 80, 90 includes two connection pairs each of which has a pair of two connection portions adjacent to each other in the circumferential direction. That is, the first phase bus bar 70 includes two connection pairs 79*t* in each of which two connection portions 79 are arranged in the circumferential direction, the second phase bus bar 80 includes two connection pairs 89*t* in each of which two connection portions 89 are arranged in the circumferential direction, and the third phase bus bar 90 includes two connection pairs 99*t* in each of which two connection portions 99 are arranged in the circumferential direction.

The two conductor connection bodies 60 connected to the connection pair 79*t* of the first phase bus bar 70 are the U-phase conductor connection body 60U and the first end 63 of the two conductor connection bodies 60 (connection body pair 69 in FIG. 4) that pass through the slots S adjacent to each other in the circumferential direction and are mounted on the stator core 20. Similarly, the two conductor connection bodies 60 connected to the connection pair 89*t* of the second phase bus bar 80 are the first end 63 of the V-phase connection body pair 69. Furthermore, the two conductor connection bodies 60 connected to the connection pair 99*t* of the third phase bus bar 90 are the first end 63 of the W-phase connection body pair 69.

FIG. 8 is a sectional view illustrating the bus bar unit 5 taken along a line VIII-VIII in FIG. 7. The sectional line in FIG. 8 passes through the connection portion 89 of the second phase bus bar 80 in the plurality of connection portions 79, 89, 99.

As illustrated in FIG. 8, the first end 63 of the coil end 30*e* includes an extension 63*b* extending obliquely upward toward the radial outside, and a distal end portion 63*a* extending upward from a distal end of the extension 63*b*. The first end 63 is connected to the connection portion 89 at the distal end portion 63*a*. The first end 63 passes through the upper side of the neutral point bus bar 10 and is connected to the connection portion 89 in the extension 63*b*.

In the present specification, "the first end 63 passes through the upper side of the neutral point bus bar 10" means that a part (the extension 63*b* in the embodiment) of the first end 63 is disposed above the neutral point bus bar 10 and overlaps the neutral point bus bar when viewed from the vertical direction.

The paths of the connection portion 89 of the second phase bus bar 80 and the first end 63 connected to the connection portion 89 in the plurality of phase bus bars 70, 80, 90 have been described. However, the first end 63 connected to other phase bus bars 70, 80, 90 similarly passes through the upper side of the neutral point bus bar 10. However, the neutral point bus bar 10 is disposed radially inside for the two connection portions 79 of the connection pair 79*t* disposed closest to one side 91 in the circumferential direction in the plurality of connection pairs 79*t*, 89*t*, 99*t*. For this reason, the neutral point bus bar 10 is not disposed below the first end 63 connected to the connection portion 79.

According to the embodiment, the neutral point bus bar 10 and the phase busbars 70, 80, 90 are disposed while overlapped each other in the radial direction. For this reason, even when the sectional area is increased by widening the neutral point bus bar 10 and the phase bus bars 70, 80, 90, the radial dimension is not increased. That is, according to the motor 1 of the embodiment, the increase in the radial dimension can be prevented while the sectional areas of the neutral point bus bar 10 and the phase bus bars 70, 80, 90 are increased in response to the increase in current. In particular, according to the embodiment, the neutral point bus bar 10 and the phase bus bars 80, 90, 99 have a plate shape with the radial direction as the plate thickness direction. Thus, the neutral point bus bar 10 and the phase bus bars 70, 80, 90 are disposed while overlapped each other in the radial direction, the increase in the radial dimension can be effectively prevented.

According to the embodiment, the first end 63 passes through the upper side of the neutral point bus bar 10 and is connected to the connection portions 79, 89, 99. The phase bus bar 70 is disposed on the radial outside of the neutral point bus bar 10, so that the first end 63 is drawn radially outward to the phase bus bar 70. According to the embodiment, the region on the upper side of the neutral point bus bar can be effectively used as the path of the first end 63, and the increase in size of the entire motor 1 can be prevented.

As illustrated in FIG. 7, the first end 63 connected to the connection portions 79, 89, 99 passes between the neutral point connection portions 19 arranged in the circumferential direction in the extension 63b. The position of the extension 63b in the vertical direction is matched with the position of the neutral point connection portion 19 in the vertical direction. According to the embodiment, the space between the neutral point connection portions 19 arranged in the circumferential direction can be effectively used as the path of the first end 63.

As illustrated in FIG. 6, the input terminal portions 78, 88, 98 of the phase bus bars 70, 80, 90 extend upward from the main bodies 71, 81, 91, respectively. As illustrated in FIG. 5, the input terminal portions 78, 88, 98 are connected to the connection bus bars 110, 120, 130 of the connection bus bar unit 100.

In the embodiment, the input terminal portions 18, 88, 98 include inclination portions 78a, 88a, 98a that are inclined radially outward toward the upper side. The connection portions 19, 79, 89, 99 connected to the phase bus bars 70, 80, 90 or the neutral point bus bars 10 are disposed on the radial inside of the input terminal portions 78, 88, 98. According to the embodiment, the input terminal portions 78, 88, 98 are retracted radially outward with respect to the connection portions 19, 79, 89, 99 in the region above the inclination portions 78a, 88a. Thus, the portions exposed from the holding member 5a can be disposed apart from each other in the radial direction, and the insulation distance between the portions can be secured.

As illustrated in FIGS. 6 and 7, the main body 71 of the first phase bus bars 70 is curved along the circumferential direction. When viewed from the axial direction, the main body 11 is disposed on the second virtual circle VC2 over the entire length. The main body 71 extends along the circumferential direction with a substantially uniform plate width (dimension along the axial direction) over the entire length. The main body 71 is disposed in the first layer L1 over the entire length.

The main body 71 of the first phase bus bar 70 includes a base portion 72, a first circumferential end portion 73, and a second circumferential end portion 75. The first circumferential end portion 73 is located on one side θ1 in the circumferential direction of the base portion 72. On the other hand, the second circumferential end portion 75 is located on the other side 92 in the circumferential direction of the base portion 72.

The two connection pairs 79t of the first phase bus bar 70 extend upward from the first circumferential end portion 73 and the second circumferential end portion 75. That is, one of the two connection pairs 79t is disposed at the end portion on one side θ1 in the circumferential direction of the main body 71, and the other is disposed at the end portion on the other side θ2 in the circumferential direction of the main body 71.

The input terminal portion 78 of the first phase bus bar 70 is disposed between the two connection pairs 79t in the circumferential direction. The input terminal portion 78 extends upward from the base portion 72.

The main body 81 of the second phase bus bar 80 is curved along the circumferential direction. The main body 81 includes a base portion 82, a first circumferential end portion 83, a second circumferential end portion 85, a first connection portion 84, and a second connection portion 86.

The base portion 82 of the second phase bus bar 80 is located in the first layer L1. The base portion 82 is disposed on the third virtual circle VC3. The base portion 82 overlaps the first phase bus bar 70 in the radial direction. The base portion 82 is disposed on the radial outside of the main body 71 of the first phase bus bar 70.

The first circumferential end portion 83 of the second phase bus bar 80 is located on one side θ1 in the circumferential direction of the base portion 82. The first circumferential end portion 83 is disposed in the second layer L2. That is, the first circumferential end portion 83 is disposed above the base portion 82. The first circumferential end portion 83 is disposed on the second virtual circle VC2. The first circumferential end portion 83 overlaps the first phase bus bar 70 in the axial direction.

The first connection portion 84 is disposed between the base portion 82 and the first circumferential end portion 83. That is, the first connection portion 84 connects the base portion 82 and the first circumferential end portion 83. As described above, the base portion 82 and the first circumferential end portion 83 have different layers in the vertical direction. For this reason, the first connection portion 84 extends across different layers in the vertical direction. The first connection portion 84 includes a first axial extension 84b extending in the axial direction between the base portion 82 and the first circumferential end portion 83. The first axial extension 84b extends across the first layer L1 and the second layer L2.

Furthermore, the base portion 82 and the first circumferential end portion 83 have different virtual circles on which the base portion 82 and the first circumferential end portion 83 are overlapped when viewed from the axial direction. For this reason, the first connection portion 84 extends across different virtual circles when viewed from the vertical direction. The first connection portion 84 includes a first radial extension 84a extending in the radial direction between the base portion 82 and the first circumferential end portion 83. The first radial extension 84a extends across between the second virtual circle VC2 and the third virtual circle VC3. As described above, the first connection portion 84 includes the first radial extension 84a and the first axial extension 84b.

The second circumferential end portion 85 of the second phase bus bar 80 is located on the other side θ2 in the circumferential direction of the base portion 82. The second circumferential end portion 85 is disposed in the second layer L2. That is, the second circumferential end portion 85 is disposed above the base portion 82. The second circumferential end portion 85 is disposed on the second virtual circle VC2. The second circumferential end portion 85 overlaps the third phase bus bar 90 in the axial direction.

The second connection portion 86 is disposed between the base portion 82 and the second circumferential end portion 85. That is, the second connection portion 86 connects the base portion 82 and the second circumferential end portion 85. As described above, the base portion 82 and the second circumferential end portion 85 have different layers in the vertical direction. Therefore, the second connection portion 86 extends across different layers in the vertical direction. The second connection portion 86 includes a second axial extension 86b extending in the axial direction between the base portion 82 and the second circumferential end portion 85. The second axial extension 86b extends across between the first layer L1 and the second layer L2.

Furthermore, the base portion 82 and the second circumferential end portion 85 have different virtual circles on which the base portion 82 and the second circumferential end portion 85 are overlapped when viewed from the axial direction. For this reason, the second connection portion 86 extends across different virtual circles when viewed from the vertical direction. The second connection portion 86 includes a second radial extension 86a extending in the radial direction between the base portion 82 and the second circumferential end portion 85. The second radial extension 86a extends across between the second virtual circle VC2 and the third virtual circle VC3. As described above, the second connection portion 86 includes the second radial extension 86a and the second axial extension 86b.

The two connection pairs 89t of the second phase bus bar 80 extend upward from the first circumferential end portion 83 and the second circumferential end portion 85. That is, one of the two connection pairs 89t is disposed at the end portion on one side θ1 in the circumferential direction of the second phase bus bar 80, and the other is disposed at the end portion on the other side θ2 in the circumferential direction of the second phase bus bar 80.

The input terminal portion 88 of the second phase bus bar 80 is disposed between the two connection pairs 89t in the circumferential direction. The input terminal portion 88 extends upward from the base portion 82.

The main body 91 of the third phase bus bar 90 is curved along the circumferential direction. The main body 91 includes a base portion 92, a first circumferential end portion 93, a second circumferential end portion 95, a first connection portion 94, and a second connection portion (connection portion) 96.

The base portion 92 of the third phase bus bar 90 is located in the second layer L2. The base portion 92 is disposed on the third virtual circle VC3. The base portion 92 overlaps the base portion 82 of the second phase bus bar 80 in the axial direction. The base portion 92 is disposed above the base portion 82 of the second phase bus bar 80. That is, at least a part of the base portion 82 of the second phase bus bar 80 overlaps the third phase bus bar 90 in the axial direction.

The first circumferential end portion 93 of the third phase bus bar 90 is located on one side θ1 in the circumferential direction of the base portion 92. The first circumferential end portion 93 is disposed in the second layer L2. The first circumferential end portion 93 overlaps the upper side (one side in the axial direction) of the first phase bus bar 70. The first circumferential end portion 93 is disposed on the second virtual circle VC2. The first circumferential end portion 93 is disposed on the radial inside of the input terminal portion 88 of the second phase bus bar 80. That is, the first circumferential end portion 93 overlaps the radial inside of the second phase bus bar 80.

The first connection portion 94 is disposed between the base portion 92 and the first circumferential end portion 93. That is, the first connection portion 94 connects the base portion 92 and the first circumferential end portion 93. As described above, the base portion 92 and the first circumferential end portion 93 have different virtual circles on which the base portion 92 and the first circumferential end portion 93 are overlapped when viewed from the axial direction. For this reason, the first connection portion 94 extends across different virtual circles when viewed from the vertical direction. The first connection portion 94 includes a first radial extension 94a extending in the radial direction between the base portion 92 and the first circumferential end portion 93. The first radial extension 94a extends across between the second virtual circle VC2 and the third virtual circle VC3.

The second circumferential end portion 95 of the third phase bus bar 90 is located on the other side θ2 in the circumferential direction of the base portion 92. The second circumferential end portion 95 is disposed in the first layer L1. Accordingly, the second circumferential end portion 95 is disposed below the base portion 92. The second circumferential end portion 95 is disposed while overlapped on the lower side of the second circumferential end portion 85 of the second phase bus bar 80. In other words, the second circumferential end portion 85 of the second phase bus bar 80 overlaps the third phase bus bar 90 in the axial direction. The second circumferential end portion 95 is disposed on the second virtual circle VC2. The second circumferential end portion 95 overlaps the radial outside of the neutral point bus bar 10.

The second connection portion 96 is disposed between the base portion 92 and the second circumferential end portion 95. That is, the second connection portion 96 connects the base portion 92 and the second circumferential end portion 95. As described above, the base portion 92 and the second circumferential end portion 95 have different layers in the vertical direction. Therefore, the second connection portion 96 extends across different layers in the vertical direction. The second connection portion 96 includes a second axial extension 96b extending in the axial direction between the base portion 92 and the second circumferential end portion 95. The second axial extension 96b extends across between the first layer L1 and the second layer L2.

Further, the base portion 92 and the second circumferential end portion 95 have different virtual circles on which the base portion 92 and the second circumferential end portion 95 are overlapped when viewed from the axial direction. For this reason, the second connection portion 96 extends across different virtual circles when viewed from the vertical direction. The second connection portion 96 includes a second radial extension 96a extending in the radial direction between the base portion 92 and the second circumferential end portion 95. The second radial extension 96a extends across between the second virtual circle VC2 and the third virtual circle VC3. As described above, the second connection portion 96 includes the second radial extension 96a and the second axial extension 96b.

The two connection pairs 99t of the third phase bus bar 90 extend upward from the first circumferential end portion 93 and the second circumferential end portion 95. That is, one of the two connection pairs 99t is disposed at the end portion on one side θ1 in the circumferential direction of the third phase bus bar 90, and the other is disposed at the end portion on the other side θ2 in the circumferential direction of the third phase bus bar 90.

The input terminal portion 98 of the third phase bus bar 90 is disposed between the two connection pairs 99t in the circumferential direction. The input terminal portion 98 extends upward from the base portion 92.

According to the embodiment, in the second phase bus bar 80, the base portion 82 overlaps the first phase bus bar 70 in the radial direction, and the first circumferential end portion 83 overlaps the first phase bus bar 70 in the axial direction. That is, according to the embodiment, the second phase bus bar 80 partially overlaps the first phase bus bar 70 in the radial direction, and partially overlaps the first phase bus bar 70 in the axial direction. As described above, the plurality of phase bus bars 70, 80, 90 of the embodiment are laminated in the radial direction and the axial direction. Thus, the dimensions in the radial direction and the axial direction can be adjusted in a well-balanced manner as compared with the case of lamination in only one of the radial direction and the axial direction. Consequently, most of the bus bar unit 5 can be prevented from protruding from the coil end 30e in the axial direction, and prevented from protruding outward from the core back 21 in the radial direction.

In the embodiment, at any position in the circumferential direction, one or two of the three phase bus bars 70, 80, 90 are disposed in the axial direction and one or two phase bus bars 70, 80, 90 are disposed in the radial direction. That is, at least three phase bus bars 70, 80, 90 are not laminated in the axial direction or at least three phase bus bars 70, 80, 90 are not laminated in the radial direction.

Furthermore, the second phase bus bar 80 overlaps the third phase bus bar 90 on the upper side in the base portion 82, and overlaps the third phase bus bar 90 on the lower side in the second circumferential end portion 85. That is, the second phase bus bar 80 and the third phase bus bar 90 are disposed such that the vertical relationship of the second phase bus bar 80 and the third phase bus bar 90 is partially reversed in the axial direction. Thus, the second phase bus bar 80 and the third phase bus bar 90 are crossed each other, a degree of freedom in disposition of the connection portions 89, 99 is increased, and the connection process and the winding configuration can be simplified.

According to the embodiment, the connection portions 84, 86, 94, 96 of the second phase bus bar 80 and the third phase bus bar 90 connect the base portions 82, 92 and the circumferential end portions 83, 85, 93, 95. The connection portions 84, 86, 94, 96 include radial extensions 84a, 86a, 94a, 96a and axial extensions 84b, 86b, 96b. The radial extensions 84a, 86a, 94a, 96a extend across between the second virtual circle VC2 and the third virtual circle VC3, and the axial extensions 84b, 86b, 96b extend across between the first layer L1 and the second layer L2. The second phase bus bar 80 and the third phase bus bar 90 are configured so as to straddle the layers in the axial direction (the first layer L1 or the second layer L2) and the layers in the radial direction (the second virtual circle VC2 or the third virtual circle VC3) only in the connection portions 84, 86, 94, 96. According to the embodiment, the phase bus bars 70, 80, 90 are disposed while maintaining a distance between the layers in the region other than the connection portion, and the stability of the insulation and the stability of the mold are enhanced.

The holding member 5a is made of an insulating resin member. The holding member 5a is molded by insert molding in which a part of the neutral point bus bar 10 and the plurality of phase bus bars 70, 80, 90 is embedded. Thus, the holding member 5a holds the neutral point bus bars 10 and the phase bus bars 70, 80, 90.

In the holding member 5a, the neutral point bus bar main body 11 of the neutral point bus bar 10 is embedded, and the neutral point connection portion 19 is exposed. In the holding member 5a, the main bodies 71, 81, 91 of the phase bus bars 70, 80, 90 are embedded, and the connection portions 79, 89, 99 and the input terminal portions 78, 88, 98 are exposed.

The holding member 5a extends in the arcuate shape centered on the center axis line J. The holding member 5a includes the inner circumferential surface 5j facing radially inward and an outer circumferential surface 5k facing radially outward.

The first thermometer holder 5b is provided on the inner circumferential surface 5j of the holding member 5a. The first thermometer holder 5b is disposed at an end on the other side θ2 in the circumferential direction of the inner circumferential surface 5j. On the other hand, a second thermometer holder 5c is provided on the outer circumferential surface 5k of the holding member 5a. The second thermometer holder 5c is disposed at an end on one side θ1 in the circumferential direction of the outer circumferential surface 5k.

The first thermometer holder 5b has a recessed shape that is open radially inward and upward. The first thermometer holder 5b reaches the retreat portion 12 of the neutral point bus bar 10. That is, the retreat portion 12 of the neutral point bus bar 10 is exposed on the inner surface of the first thermometer holder 5b. The bus bar thermometer 5e is disposed in the first thermometer holder 5b. The bus bar thermometer 5e comes into contact with the neutral point bus bar 10 in the first thermometer holder 5b and measures a temperature of the neutral point bus bar 10.

The second thermometer holder 5c has a recessed shape that is open radially outward and in the vertical direction. The oil thermometer 5f is disposed in the second thermometer holder 5c. Because the second thermometer holder 5c is open in the vertical direction, oil is easy to escape. The oil thermometer 5f can measure the temperature of the oil passing through the second thermometer holder 5c.

A plurality of wiring holders 5p is provided on the outer circumferential surface 5k of the holding member 5a. The plurality of wiring holders 5p are arranged along the circumferential direction. The wiring holder 5p has a hook shape that is open downward. The wiring holder 5p holds wirings 5ea, 5fa extending from the bus bar thermometer 5e and the oil thermometer 5f. The wiring 5ea of the bus bar thermometer 5e extends to one side θ1 in the circumferential direction along the outer circumferential surface 5k of the holding member 5a. Similarly, the wiring 5fa of the oil thermometer 5f extends in the other side θ2 in the circumferential direction along the outer circumferential surface 5k of the holding member 5a. The wiring 5ea of the bus bar thermometer 5e and the wiring 5fa of the oil thermometer 5f are bundled on the outer circumferential surface 5k in the circumferential center of the bus bar unit 5 and drawn out to a control device (not illustrated).

As illustrated in FIG. 5, a plurality of recess grooves (recess portions) 5g arranged along the circumferential direction is provided in the inner circumferential surface 5j of the holding member 5a. The plurality of recess grooves 5g are located below the connection portions 79, 89, 99. The recess groove 5g extends downward from the connection portions 79, 89, 99. That is, the connection portions 79, 89, 99 are connected to the upper end of the recess groove 5g. The recess groove 5g is inclined downward toward the radial inside. The lower end of the recess groove 5g is open radially inward at the inner circumferential surface 5j.

As illustrated in FIG. 8, a part of the first end 63 (the extension 63b in the embodiment) is inserted into the recess groove 5g. The first end 63 inserted into the recess groove 5g is connected to the connection portions 79, 89, 99 disposed on the upper side of the recess groove 5g. According to the embodiment, the bus bar unit 5 can be positioned in the circumferential direction with respect to the first end 63 by inserting the first end 63 into the recess groove 5g. Thus, in the process of joining the connection portions 79, 89, 99 of the bus bar unit 5 and the first end 63, the connection portions 79, 89, 99 and the first end 63 can be prevented from being displaced in the circumferential direction, and the joining process can be stably performed. The first end 63 may be fitted in the recess groove 5g, thereby being fixed to the holding member 5a.

As illustrated in FIG. 5, the connection bus bar unit 100 is disposed while laminated with the bus bar unit 5 in the vertical direction. The connection bus bar unit 100 is connected to the bus bar unit 5 and an inverter (not illustrated) The inverter supplies the power to the stator 2 through the connection bus bar unit 100 and the bus bar unit 5.

The connection bus bar unit 100 includes three connection bus bars 110, 120, 130, a first fixing portion 101, a second fixing portion 102, and a third fixing portion 103. In the three connection bus bars 110, 120, 130, the first connection bus bar 110 is connected to the first phase bus bar 70, the second connection bus bar 120 is connected to the second phase bus bar 80, and the third connection bus bar 130 is connected to the third phase bus bar 90.

Figure 9:
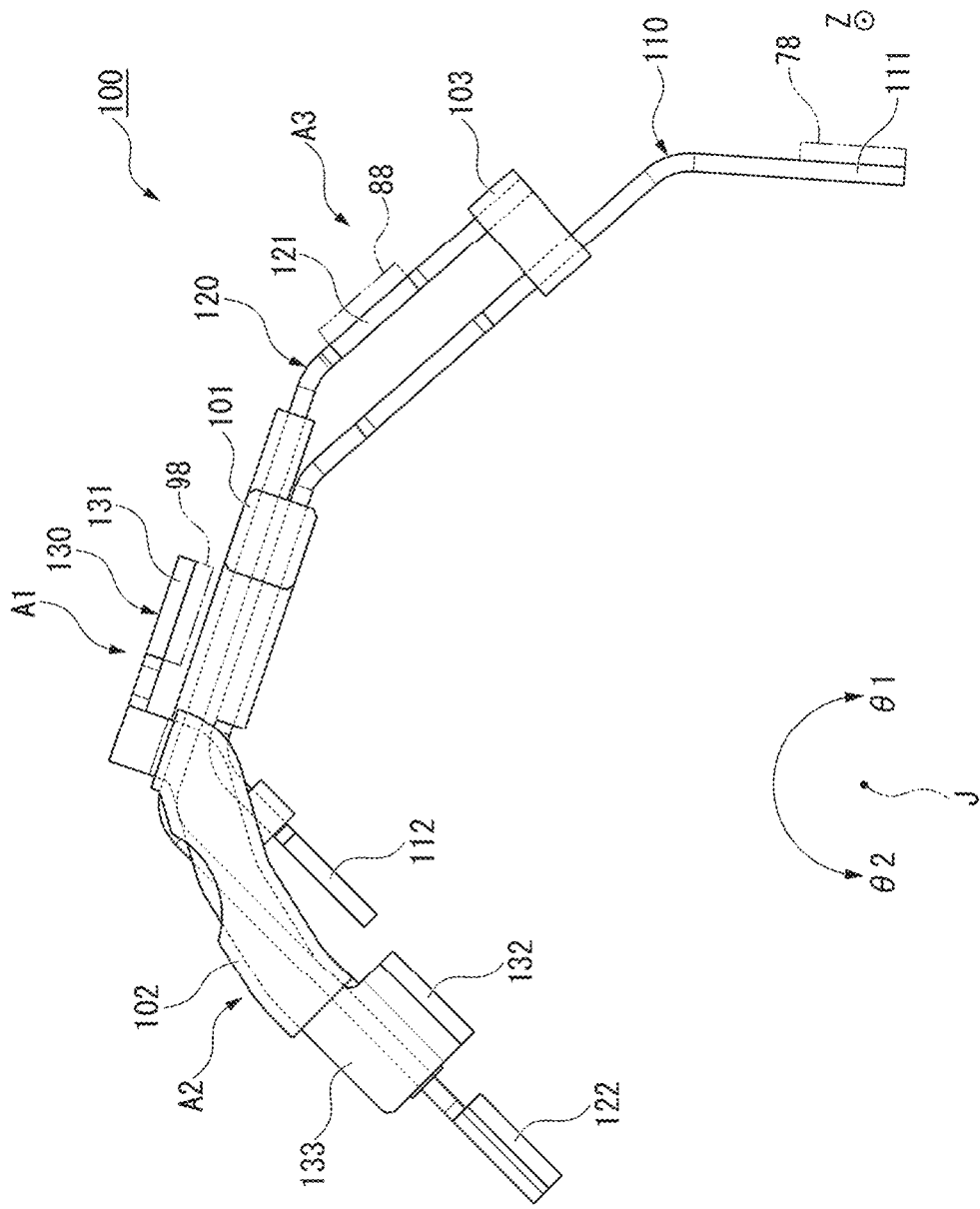
FIG. 9 is a plan view illustrating the connection bus bar unit of the embodiment.

FIG. 9 is a plan view of the connection bus bar unit 100. The connection bus bars 110, 120, 130 have a plate shape. The connection bus bars 110, 120, 130 extend along the circumferential direction. The three connection bus bars 110, 120, 130 include first end portions 111, 121, 131 and second end portions 112, 122, 132, respectively.

The first end portions 111, 121, 131 are disposed on one side θ1 in the circumferential direction on the connection bus bars 110, 120, 130. The first end portions 111, 121, 131 are joined to the input terminal portions 78 of any one of the phase bus bars 70, 80, 90 by joining means such as welding.

The second end portions 112, 122, 132 are disposed on the other side θ2 in the circumferential direction of the connection bus bars 110, 120, 130. The second end portions 112, 122, 132 are connected to an inverter (not illustrated).

In the first connection bus bar 110 and the second connection bus bar 120, the direction orthogonal to the axial direction over the entire length is set to the plate thickness direction. In the third connection bus bar 130, the direction orthogonal to the axial direction at the first end portion 131 and the second end portion 132 is set to the plate thickness direction, and the axial direction at the portion between the first end portion 131 and the second end portion 132 is set to the plate thickness direction. In the following description, a location of the third connection bus bar 130 in which the axial direction is set to the plate thickness direction is referred to as an orthogonal disposition portion 133.

The orthogonal disposition portion 133 is located immediately above the first connection bus bar 110 and the second connection bus bar 120. That is, the orthogonal disposition portion 133 is located above the first connection bus bar 110 and the second connection bus bar 120, and overlaps the first connection bus bar 110 and the second connection bus bar 120 when viewed from the axial direction. That is, a region where one of the three connection bus bars 110, 120, 130 is overlapped in the axial direction is provided in the connection bus bar unit 100.

From the viewpoint of the relative positional relationship among the three connection bus bars 110, 120, 130, in the connection bus bar unit 100, a first region A1, a second region A2, and a third region A3 are provided in the circumferential direction. The first region A1 is a region where three connection bus bars 110, 120, 130 are arranged in the radial direction. The second region A2 is a region where the two connection bus bars 110, 120 are arranged in the radial direction while the one connection bus bar 130 overlaps other two connection bus bars 110, 120 in the axial direction. The third region A3 is a region where only the two connection bus bars 110, 120 are arranged in the radial direction. The regions are arranged from one side θ1 in the circumferential direction toward the other side θ2 in the circumferential direction in order of the third region A3, the first region A1, and the second region A2.

According to the connection bus bar unit 100 of the embodiment, the second region A2 where the third connection bus bar 130 is overlapped in the axial direction and the first region A1 where the third connection bus bar 130 is overlapped in the radial direction are selectively used depending on the circumferential position. Thus, the paths of the connection bus bars 110, 120, 130 are easy set optimally in consideration of the interference with other members and the insulation distance.

According to the embodiment, in the connection bus bar unit 100, the third connection bus bar 130 is disposed above the first connection bus bar 110 and the second connection bus bar 120 in the second region A2. Thus, radial enlargement in the second region A2 can be prevented in the connection bus bar unit 100.

In the first fixing portion 101, the second fixing portion 102, and the third fixing portion 103, at least two of the three connection bus bars 110, 120, 130 are fixed to each other. The first fixing portion 101, the second fixing portion 102, and the third fixing portion 103 are disposed in the first region A1, the second region A2, and the third region A3, respectively.

The first fixing portion 101 holds the two connection bus bars 110, 120 disposed radially in the first region A1, but does not hold the third connection bus bar 130 disposed in the first region A1. The second fixing portion 102 holds the three connection bus bars 110, 120, 130 in the second region A2. The third fixing portion 103 holds the two connection bus bars 110, 120 in the third region A3.

According to the embodiment, the connection bus bar unit 100 includes the first fixing portion 101, the second fixing portion 102, and the third fixing portion 103 that hold the connection bus bars 110, 120, 130. For this reason, when the impact or vibration acts on the motor 1, the load applied to the connection portion between the connection bus bars 110, 120, 130 and the phase bus bars 10, 80, 90 can be reduced, and the connection between the bus bars can be stabilized.

According to the fixing portions 101, 102, 103 of the embodiment, all the connection bus bars 110, 120, 130 are held only in the second region A2. The second region A2 is a region where one connection bus bar 130 is laminated in the axial direction while other two connection bus bars 110, 120 are laminated in the radial direction. According to the embodiment, for example, as compared with the case where all the connection bus bars 110, 120, 130 are held in the region where all the connection bus bars 110, 120, 130 are arranged in the radial direction like the first region A1 and the like, the enlargement of the fixing portion can be prevented. As a result, the connection bus bar unit 100 and the motor 1 can be downsized.

Although the embodiment of the present invention is described above, structures in the embodiment are examples, and thus addition, elimination, replacement of structure, and other modifications can be made within a range without departing from the spirit of the present invention. Also note that the present invention is not limited by the embodiment. For example, in the embodiment, the case where the motor 1 is the three-phase motor has been described. However, the motor may be another motor such as a five-phase motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor including:
a rotor rotatable about a center axis line;
a stator disposed on a radially outside of the rotor; and
a bus bar unit disposed on one side in an axial direction of the stator, wherein
the stator includes:
a stator core; and
a winding portion including a plurality of conductor connection bodies and configuring a segment coil,
the conductor connection body includes a first end and a second end that are provided at one end and the other end of the conductor connection body, respectively, and extend to one side in the axial direction,
the bus bar unit includes:
a neutral point bus bar connected to the first end; and
a plurality of phase bus bars connected to the second end,
the neutral point bus bar extends along a circumferential direction,
the phase bus bar includes:
a main body extending along the circumferential direction, at least a part of the main body overlapping a radial outside of the neutral point bus bar; and
a connection portion extending from the main body to one side in the axial direction, and
the first end passes through one side in the axial direction of the neutral point bus bar and is connected to the connection portion.

2. The motor according to claim 1, wherein
the plurality of phase bus bars include a first phase bus bar and a second phase bus bar, and
the main body of the second phase bus bar includes:
a base portion overlapping the first phase bus bar in the radial direction;
a first circumferential end portion that is located on one side in the circumferential direction of the base portion and overlaps the first phase bus bar in the axial direction; and
a first connection portion connecting the base portion and the first circumferential end portion.

3. The motor according to claim 2, wherein
the first connection portion of the second phase bus bar includes:
a first radial extension extending radially between the base portion and the first circumferential end portion; and
a first axial extension extending axially between the base portion and the first circumferential end portion.

4. The motor according to claim 2, wherein
the plurality of phase bus bars include a third phase bus bar, and
the main body of the second phase bus bar includes:
a second circumferential end portion that is located on the other side in the circumferential direction of the base portion and overlaps the third phase bus bar on one side in the axial direction; and
a second connection portion connecting the base portion and the second circumferential end portion, and
at least a part of the base portion overlaps the third phase bus bar on the other side in the axial direction.

5. The motor according to claim 4, wherein
the second connection portion of the second phase bus bar includes:
a second radial extension extending radially between the base portion and the second circumferential end portion; and
a second axial extension extending axially between the base portion and the second circumferential end portion.

6. The motor according to claim 4, wherein
the main body of the third phase bus bar includes:
the base portion overlapping one side in the axial direction of the second phase bus bar;
the first circumferential end portion that is located on one side in the circumferential direction of the base portion of the third phase bus bar and overlaps a radial inside of the second phase bus bar and one side in an axial direction of the first phase bus bar; and
the second circumferential end portion that is located on the other side in the circumferential direction of the base portion of the third phase bus bar and overlaps a radial outside of the neutral point bus bar.

7. The motor according to claim 6, wherein
the main body of the third phase bus bar includes a connection portion radially opposite to the second connection portion of the second phase bus bar, and
the connection portion extends axially between the base portion and the second circumferential end portion in the third phase bus bar.

8. The motor according to claim 1, further comprising three of the phase bus bars,
wherein one or two of the three phase bus bars are arranged in the axial direction at any position in the circumferential direction, and one or two phase bus bars are arranged in the radial direction at any position in the circumferential direction.

9. The motor according to claim 1, further comprising a retreat portion that extends in the circumferential direction more than any of the plurality of phase bus bars and is curved radially outward at an end on one side or the other side in the circumferential direction of the neutral point bus bar.

10. The motor according to claim 1, wherein
the bus bar unit includes:
a thermometer; and
a holding member holding the neutral point bus bar and the phase bus bar, and
the holding member includes a thermometer holder holding the thermometer.

11. The motor according to claim 1, wherein
the bus bar unit includes a holding member holding the neutral point bus bar and the phase bus bar,
in the holding member, the main body of the phase bus bar is embedded and the connection portion is exposed, and
a recess is positioned below the connecting portion on an inner circumferential surface of the holding member facing radially inward, a part of the first end connected to the connection portion being inserted in the recess.

12. The motor according to claim 1, further comprising three of the phase bus bars, wherein
each of the phase bus bars includes a connection pair in which two of the connection portions are arranged in the circumferential direction, and
the connection pairs of the three phase bus bars are arranged in order along the circumferential direction.

13. The motor according to claim 1, wherein
the neutral point bus bar includes:
a neutral point bus bar main body extending along the circumferential direction; and
a plurality of neutral point connection portions that protrude from the neutral point bus bar main body toward one side in the axial direction and are arranged along the circumferential direction, and axial positions of the connection portions of all the phase bus bars and the neutral point connection portion are matched with each other.

14. The motor according to claim 1, wherein the neutral point bus bar and the phase bus bar have a plate shape with the radial direction as a plate thickness direction.

15. The motor according to claim 1, further comprising a connection bus bar unit that is disposed while laminated with the bus bar unit in the axial direction and is connected to the bus bar unit, wherein the connection bus bar unit includes three connection bus bars that extend along a circumferential direction and are connected to the phase bus bars different from each other, and the connection bus bar unit includes:

a first region where three of the connection bus bars are arranged in the radial direction; and a second region where two of the connection bus bars are arranged in the radial direction while one connection bus bar overlaps other two connection bus bars in the axial direction.

16. The motor according to claim 15, wherein the connection bus bar unit includes:

a first fixing portion holding two of the connection bus bars arranged radially in the first region; and a second fixing portion holding three of the connection bus bars in the second region.

17. The motor according to claim 1, wherein the phase bus bar includes an input terminal portion that extends toward one side in the axial direction and is connected to the connection bus bar, and the input terminal portion includes an inclination portion that is inclined radially outward toward an upper side.

18. The motor according to claim 1, wherein the winding portion includes a crossing portion protruding from an end face on one side in the axial direction of the stator core, and a plurality of the first ends are located on the radial outside of the crossing portion, extend from the stator core to one side in the axial direction, and are connected to the connection portion.

19. The motor according to claim 1, wherein the winding portion is 4Y-connected by the bus bar unit.

* * * * *